United States Patent Office 3,148,206
Patented Sept. 8, 1964

3,148,206
METHODS OF PREPARING CYANO PHOSPHINE OXIDES
Michael McKay Rauhut, Norwalk, and Andrew Milo Semsel, Stamford, Conn., assignors to American Cyanamid Company, Stamford, Conn., a corporation of Maine
No Drawing. Filed Mar. 4, 1963, Ser. No. 262,306
3 Claims. (Cl. 260—465.8)

The present invention relates to organophosphorous compounds and to the preparation of same. More particularly, the instant discovery concerns the preparation of tertiary phosphine oxides by a novel and straightforward method.

Heretofore, tertiary phosphine oxides of the general type contemplated herein have been prepared by a two-step process whereby the tertiary phosphine is first formed and then oxidized to its corresponding tertiary phosphine oxide. Pursuant to the instant discovery, a single step procedure has been discovered whereby tertiary phosphine oxides in generous yields are produced. As will be seen hereinafter, this is a significant contribution.

According to present invention an α,β-unsaturated compound of the formula

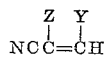

wherein Z is a member of the group selected from H, $CH_3$, and $CH_2CH_2CN$ and Y is a member selected from the group consisting of H, $CH_3$, phenyl is reacted with elemental phosphorus, a strong base and water, as will be shown, to produce the corresponding tertiary phosphine oxide having the formula

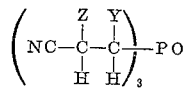

wherein Z and Y have the meaning given above.

Pursuant to a typical embodiment of the present invention the following reaction is made to take place:

$$P_4 + CH_2=CHCN + KOH + H_2O \rightarrow (CNCH_2CH_2)_3PO + KH_2PO_2$$

While the elemental phosphorus reactant employed in the equation just given is in a finely-divided solid state, the present invention contemplates the use of molten phosphorus, and therefore temperatures above the melting point of phosphorus, i.e., temperatures above 46° C. In fact, a wide range of temperatures is contemplated herein on the order of about 0° C. to about 175° C., preferably from 15° C. to 75° C.

By the same token, the reactions of the present invention may be carried out at atmospheric, sub-atmospheric and super-atmospheric pressures. At high temperatures, say, from 100° C.–175° C., super-atmospheric pressures are generally employed, as is evident to the person skilled in the art. Batch, continuous or semi-continuous processes may be employed.

According to a preferred embodiment of the instant discovery, an aqueous strong base is employed. Typical bases within the purview of the present invention are the alkali metal hydroxides, and carbonates, the alkaline earth metal hydroxides, and carbonates, quaternary ammonium hydroxides, tetramethylguanidine, pentamethylguanidine, heptamethylbiguanide, and the like. If desired, reaction is made to take place in the presence of a solvent. Typical solvents are acetonitrile, a tertiary alcohol, such as t-butyl alcohol, an ether, such as dioxane, diethoxyethane, diethylether of diethylene glycol, tetrahydrofuran, and the like, dimethylformamide, dimethylsulfoxide, pyridine and numerous other like solvents, which under the conditions of the reaction do not interfere with the production of the desired products.

Typical α,β-unsaturated nitrile reactants of the formula

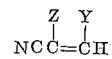

above, are acrylonitrile, methacrylonitrile, crotononitrile, cinnamonitrile, α-methyleneglutaronitrile, and the like.

Generally, the reactants contemplated herein are brought together in stoichiometric amounts. However, an excess of any of these reactants with respect to the remaining reactant may be employed and the amount of excess is governed by practicality.

The products of the present invention are useful as fire retardants for cotton cloth. For example, cotton cloth dipped, according to well-known procedures, in a suitable solution of any one of these tertiary phosphine oxides manifests desirable fire retardance.

The present invention will best be understood by virtue of the following examples which are merely illustrative and not intended to limit the scope of the invention, except insofar as the invention is described in the claims.

EXAMPLE I

*Tris(2-Cyanoethyl)Phosphine Oxide*

A mixture of 7.7 grams (0.25 gram atom) of white phosphorus, 29.7 grams (0.56 mole) of acrylonitrile, and 75 milliliters of acetonitrile is warmed to 50° C. in a creased flask under nitrogen. The mixture is stirred vigorously and cooled to 30° C. so that the phosphorus solidifies in a finely divided state. To this mixture is added dropwise with vigorous stirring 18.0 milliliters (0.18 equivalents) of 10 N aqueous potassium hydroxide during 20 minutes. The temperature is maintained at 30° C.–35° C. by cooling. The mixture is stirred one additional hour at this temperature. By the end of the reaction period a dense white solid has separated. The reaction mixture is diluted with a solution of 10 milliliters of concentrated hydrochloric acid in 300 milliliters of water. The solid dissolves giving a neutral solution containing only traces of unreacted white phosphorus. The mixture is warmed to 50° C. to melt the phosphorus, cooled to room temperature, and the solution is decanted under nitrogen. The solution is filtered through diatomaceous earth and evaporated to dryness under reduced pressure. The residue is extracted with 200 milliliters of hot methanol. The extract when cool deposits 23.5 grams (45 percent) of tris(2-cyanoethyl)phosphine oxide, melting point 165° C.–169° C. Concentration of the filtrate gives an additional 4.5 grams (9 percent), melting point 165° C.–169° C. Recrystallization from aqueous isopropyl alcohol gives material melting at 172° C.–173° C. (lit. melting point 172° C.–173° C.) which does not depress the melting point of an authentic sample. Results of similar experiments are presented in Table I.

EXAMPLES II–V

The following examples are carried out essentially as in Example I, above; the differences existing between the following examples and Example I are set out in the table:

TABLE I

| Example | Reactant | Solvent | Base | Temperature, °C. | Product |
|---|---|---|---|---|---|
| II | Methacrylonitrile | $CH_3CN$ | NaOH | 75–80 | $(NC\overset{CH_3}{\underset{\|}{C}}H\text{—}CH_2)_3P=O$ |
| III | Crotononitrile | Dimethylformamide | KOH | 75–85 | $(NC\overset{CH_3}{\underset{\|}{C}}H_2CH)_3P=O$ |
| IV | α-Methyleneglutaronitrile | $CH_3CN$ | $Ca(OH)_2$ | 75–80 | $(NCCH_2CH_2\overset{CN}{\underset{\|}{C}}HCH_2)_3P=O$ |
| V | Cinnamonitrile | $CH_3CN$ | $Ba(OH)_2$ | 75–85 | $(NCCH_2CHC_6H_5)_3P=O$ |
| VI | Acrylonitrile | Acetonitrile | $K_2CO_3$ | 25–35 | $(NCCH_2\text{—}CH_2)_3P=O$ |
| VII | Methacrylonitrile | t-butanol | $CaCO_3$ | 75–85 | $(NC\overset{CH_3}{\underset{\|}{C}}\text{—}CH_2)_3P=O$ |
| VIII | Crotononitrile | Acetonitrile | Tetrabenzyl-ammonium hydroxide | 25–35 | $(NCCH_2\overset{CH_3}{\underset{\|}{C}}H)_3P=O$ |
| IX | α-Methyleneglutaronitrile | Tetrahydrofuran | Benzyltrimethyl-ammonium hydroxide | 45–50 | $(NCCH_2CH_2\overset{CN}{\underset{\|}{C}}HCH_2)_3P=O$ |
| X | Cinnamonitrile | Dioxane | Tetramethyl-guanidine | 20–30 | $(NCCH_2CHC_6H_5)_3P=O$ |
| XI | Acrylonitrile | Pyridine | Pentamethyl-guanidine | 30–40 | $(NCCH_2CH_2)_3P=O$ |
| XII | Methacrylonitrile | Diethylether of diethylene glycol | Heptamethyl-biguanide | 30–40 | $(NC\overset{CH_3}{\underset{\|}{C}}H\text{—}CH_2)_3P=O$ |
| XIII | Acrylonitrile | Acetonitrile | Hexamethyl-biguanide | 25–35 | $(NCCH_2\text{—}CH_2)P=O$ |
| XIV | Cinnamonitrile | Dioxane | Tetramethyl-ammonium hydroxide | 20–30 | $(NCCH_2CHC_6H_5)_3P=O$ |
| XV | Acrylonitrile | Pyridine | Tetrabutyl-ammonium hydroxide | 30–40 | $(NCCH_2CH_2)_3P=O$ |
| XVI | ——do—— | ——do—— | Tribenzyl-methylammonium hydroxide | 30–40 | $(NCCH_2CH_2)_3P=O$ |

As is evident from Table I, above, tetraalkyl(lower) ammonium hydroxides, benzylalkyl(lower)ammonium hydroxides, hexaalkyl(lower)- and heptaalkyl(lower)-biguanides, broadly, are contemplated herein.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

This application is a continuation-in-part of pending U.S. application Serial No. 101,353, filed April 7, 1961, now abandoned.

We claim:

1. A method of preparing a tertiary phosphine oxide of the formula $$\left(NC\text{—}\underset{\underset{H}{\|}}{\overset{\overset{Z}{\|}}{C}}\text{—}\underset{\underset{H}{\|}}{\overset{\overset{Y}{\|}}{C}}\right)_3 PO$$

wherein Z is a member selected from the group consisting of H, $CH_3$ and $CH_2CH_2CN$ and Y is a member selected from the group consisting of H, $CH_3$ and phenyl, which comprises reacting, at a temperature in the range of about 0° C. to about 175° C., elemental phosphorus, a strong base, and water, in the presence of an inert organic solvent and with an α,β-unsaturated reactant of the formula $$NC\text{—}\underset{\underset{}{\overset{Z}{\|}}}{C}=\underset{\underset{}{\overset{Y}{\|}}}{C}H$$

wherein Z and Y are the same as above, and recovering the corresponding tertiary phosphine oxide.

2. The process of claim 1 in which the α,β-unsaturated reactant is acrylonitrile and the tertiary phosphine oxide recovered is tris(2-cyanoethyl)phosphine oxide.

3. The process of claim 1 in which the α,β-unsaturated reactant is methacrylonitrile and the tertiary phosphine oxide recovered is tris(2-cyano-2-methylethyl)phosphine oxide.

No references cited.

UNITED STATES PATENT OFFICE
CERTIFICATE OF CORRECTION

Patent No. 3,148,206            September 8, 1964

Michael McKay Rauhut et al.

It is hereby certified that error appears in the above numbered patent requiring correction and that the said Letters Patent should read as corrected below.

Columns 3 and 4, TABLE I, under the heading "Product" and opposite Example III, the formula should appear as shown below instead of as in the patent:

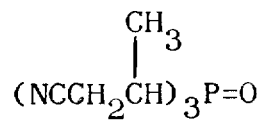

Signed and sealed this 30th day of March 1965.

(SEAL)
Attest:

ERNEST W. SWIDER            EDWARD J. BRENNER
Attesting Officer            Commissioner of Patents